US010977208B2

(12) United States Patent
West

(10) Patent No.: US 10,977,208 B2
(45) Date of Patent: Apr. 13, 2021

(54) SETUP FILE SYSTEM WITHOUT EDITING KERNEL CODE

(71) Applicant: ENTIT Software LLC, Sunnyvale, CA (US)

(72) Inventor: Jeffrey Lynn West, Southborough, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 219 days.

(21) Appl. No.: 15/762,351

(22) PCT Filed: Sep. 25, 2015

(86) PCT No.: PCT/US2015/052176
§ 371 (c)(1),
(2) Date: Mar. 22, 2018

(87) PCT Pub. No.: WO2017/052581
PCT Pub. Date: Mar. 30, 2017

(65) Prior Publication Data
US 2018/0300340 A1    Oct. 18, 2018

(51) Int. Cl.
*G06F 17/00* (2019.01)
*G06F 16/11* (2019.01)
(52) U.S. Cl.
CPC ............................. *G06F 16/113* (2019.01)
(58) Field of Classification Search
None
See application file for complete search history.

(56) References Cited

U.S. PATENT DOCUMENTS

| 7,047,380 | B2 | 5/2006 | Tormasov et al. | |
|---|---|---|---|---|
| 8,145,607 | B1 | 3/2012 | Korshunov et al. | |
| 8,620,865 | B2 | 12/2013 | Slik | |
| 8,701,114 | B2 | 4/2014 | Bhattiprolu et al. | |
| 9,769,175 | B2* | 9/2017 | Bacher | G06F 21/57 |
| 2005/0273858 | A1* | 12/2005 | Zadok | G06F 21/50 726/24 |
| 2007/0266059 | A1 | 11/2007 | Kitamura | |
| 2009/0254559 | A1 | 10/2009 | Nagano | |
| 2010/0262645 | A1* | 10/2010 | Brown | G06F 21/10 709/203 |
| 2011/0178983 | A1 | 7/2011 | Bernhard et al. | |
| 2014/0025914 | A1 | 1/2014 | Prahlad et al. | |
| 2014/0108355 | A1 | 4/2014 | Prahlad et al. | |

FOREIGN PATENT DOCUMENTS

EP         1209569        5/2002
NL         1933236 A1 *  12/2006  ............. G06F 11/14

OTHER PUBLICATIONS http:??docs.commvault/commvault/v10/article?p=products/vs_vmware/restore_adv.htm Date:Dec. 10, 2013:Title: Advanced Restore—Virtual Server Agent for Vmware.
International Searching Authority, "Notification of Transmittal of the International Search Report and the Written Opinion", PCT/US2015/052176, dated Jun. 26, 2016, 13 pages.

* cited by examiner

*Primary Examiner* — Tuankhanh D Phan

(57) ABSTRACT

A file system is setup in user space of an operating system (OS) of a device without editing kernal code of the OS. Data of a file at the device is archived to a target location. The data of the file is replaced with a link to the target location. The archived data is retrieved via the file system in response to an input/output (I/O) request to the data of the file.

20 Claims, 4 Drawing Sheets

SETUP FILE SYSTEM WITHOUT EDITING KERNEL CODE

BACKGROUND

Data archiving may be a process of moving data that is less actively used to a separate data storage device for long-term retention. Data archives may consist of older data that is still important for future reference, as well as data that is retained for regulatory compliance. Data archives may indexed and have search capabilities so that files and parts of files may be readily located and retrieved, such as via a file system.

BRIEF DESCRIPTION OF THE DRAWINGS

The following detailed description references the drawings, wherein.

DETAILED DESCRIPTION

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A technique for intercepting file system input/output (I/O) requests at the kernel level are unique to each file system, with each operating system (OS) version, such as each Linux OS version, requiring different methods for specific versions. For instance, intercepting file I/O requests requires a kernel mode module for each unique Linux file system type and Linux OS type. Integrating this type of I/O redirection into an archiving product requires unique programming and kern& mode knowledge for each file system and OS type.

Data files that have been archived off of computer systems may be tracked and restored using multiple methods. One method is to dehydrate the data from the file itself and store (archive) this data on a different system or different location on the same system, leaving behind a link file that contains a reference to the new location of the original files archived data. Once this link is created, all file read requests to this link are automatically redirected to the archived file data to fulfil the read request.

All data requested through I/O requests to the link file is returned to the application that issued the request, with no modifications to the link file. Hence, kernel mode file system filter drivers provide I/O interception that needs to be crafted for each different Linux file system type and each Linux OS type, thus requiring kernel code recompilation.

Examples provide a method to redirect file read requests from the link file in order to retrieve the requested data bytes from the archived file for file systems on OSs, such as Linux-based operating systems, without editing kernel code. In one example, a file system is setup in user space of an operating system (OS) of a device without editing kernel code of the OS. Data of a file at the device is archived to a target location. The data of the file is replaced with a link to the target location. The archived data is retrieved via the file system in response to an input/output (I/O) request to the data of the file. Thus, examples may provide a method of I/O interception that can be applied to multiple types of file systems and/or OSs without requiring kernel code recompilation.

Figure 1A:
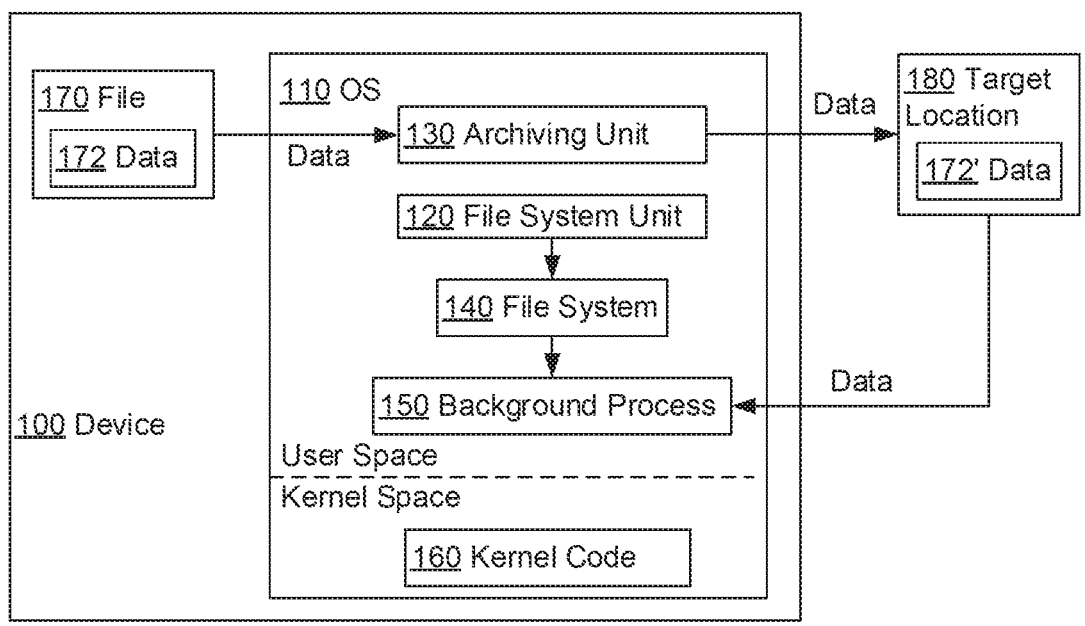
FIGS. 1A and 1B are an example block diagram of a device to setup a file system without editing kernel code.
Figure 1B:
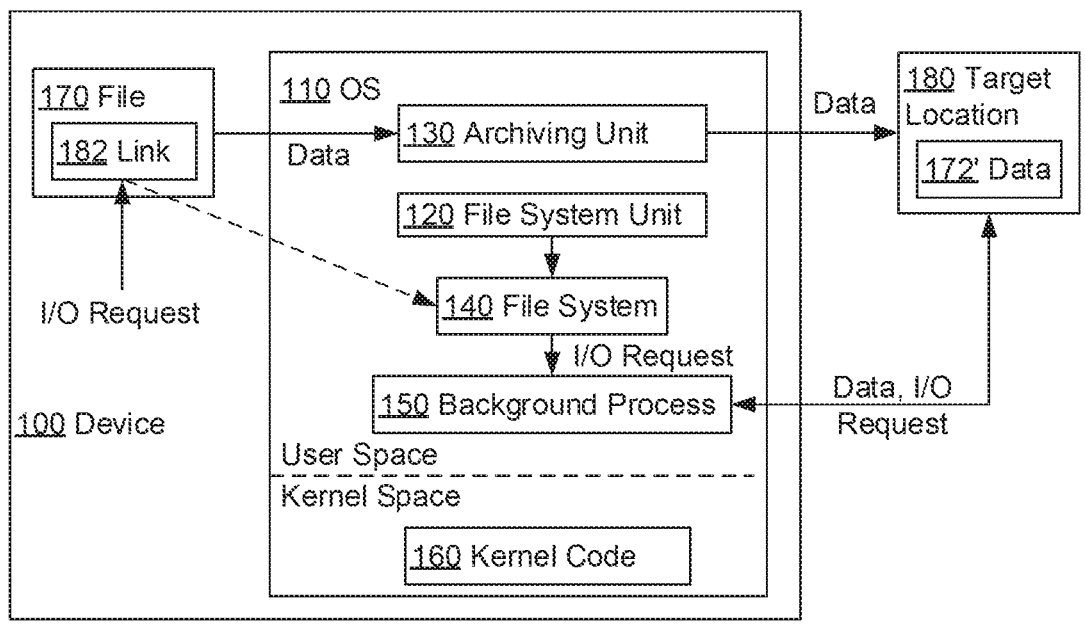

Referring now to the drawings, FIGS. 1A and 1B are an example block diagram of a device 100 to setup a file system without editing kernel code. The device 100 may include or be part of a microprocessor, a controller, a memory module or device, a notebook computer, a desktop computer, an all-in-one system, a server, a client device, a network device, a wireless device, and the like. Further, the device 100 may communicate via a network with other devices, such as storage devices.

The device 110 is shown to include a file system unit 110 and an archiving unit 114. The file system and archiving units 120 and 130 may include, for example, a hardware device including electronic circuitry for implementing the functionality described below, such as control logic and/or memory. In addition or as an alternative, the file system and archiving units 120 and 130 may be implemented as a series of instructions encoded on a machine-readable storage medium and executable by a processor.

The file system unit 120 may allow a non-privileged user to setup a file system 140 on an operating system (OS) 110 without editing kernel code 160 of the OS 110. Privilege may be defined as the delegation of authority over a computer system or device. A privilege may be a permission to perform an action. Examples of various privileges may include the ability to create a file in a directory, or to read or delete a file, access a device, or have read or write permission to a socket for communicating over the Internet. Users who have been delegated extra levels of control may be called privileged users. Users who lack most privileges may be defined as non-privileged, regular, or normal users.

The file system 140 may be used to control how data is stored and retrieved, as well as determine the way in which files are named and where they are placed logically for storage and retrieval. The OS 110 may manage hardware and/or software resources and provides common services for computer programs. A kernel may be a computer program that manages I/O requests from software, and translates them into data processing instructions for the central processing unit and other electronic components of a computer. Typically, the kernel may be responsible for memory management, process and task management, and disk management.

In one example, the OS 100 may be Linux-based or Unix-based and the file system 140 may be a Filesystem in Userspace (FUSE). FUSE may be an operating system mechanism for Unix-like computer operating systems that lets non-privileged users create their own file systems without editing kernel code. This may be achieved by running file system code in user space while the FUSE module provides only a "bridge" to the actual kernel interfaces.

The kernel code 160 may usually be loaded into a protected area of memory to prevent it from being overwritten by programs or other parts of the OS 110. The kernel may perform its tasks, such as executing processes and handling interrupts, in kernel space, whereas everything a user normally does, such as writing text in a text editor or running programs in a GUI (graphical user interface), is done in user space. This separation prevents user data and kernel data from interfering with each other and thereby diminishing performance or causing the system or device to become unstable (and possibly crashing).

As shown in FIG. 1A, the archiving unit 130 may archive data of a file 170 at the device 100 to a target location 180 remote from the device 100, such as a network storage device. As shown in FIG. 1B, the file system 140 may replace the data 172 of the file at the device with a link 182 to the target location 180. The file system 140 may be setup in user space by a non-privileged user.

Further, the file system 140 may redirect an input/output (I/O) request to the file 170 via the link 182. For instance, the file system 140 may redirect the I/O request to a background process 150, such as a daemon, to retrieve the archived data 172'. The term daemon may refer to a computer program that runs as a background process, rather than being under the direct control of an interactive user.

Figure 2:
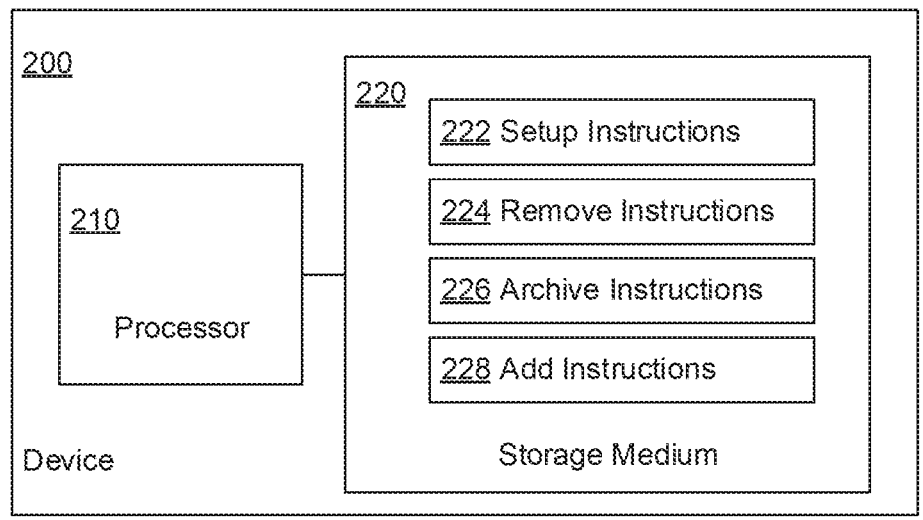
FIG. 2 is an example block diagram of a computing device including instructions for setting up a file system without editing kernel code.

FIG. 2 is an example block diagram of a computing device 200 including instructions for setting up a file system without editing kernel code. In the embodiment of FIG. 2, the computing device 200 includes a processor 210 and a machine-readable storage medium 220. The machine-readable storage medium 220 further includes instructions 222, 224, 266 and 228 for setting up the file system without editing the kernel code.

The computing device 200 may be included in or part of, for example, a microprocessor, a controller, a memory module or device, a notebook computer, a desktop computer, an all-in-one system, a server, a network device, a wireless device, or any other type of device capable of executing the instructions 222, 224, 226 and 228. In certain examples, the computing device 200 may include or be connected to additional components such as memories, controllers, etc.

The processor 210 may be, at least one central processing unit (CPU), at least one semiconductor-based microprocessor, at least one graphics processing unit (GPU), a micro-controller, special purpose logic hardware controlled by microcode or other hardware devices suitable for retrieval and execution of instructions stored in the machine-readable storage medium 220, or combinations thereof. The processor 210 may fetch, decode, and execute instructions 222, 224, 226 and 228 to implement setting up the file system without editing the kernel code. As an alternative or in addition to retrieving and executing instructions, the processor 210 may include at least one integrated circuit (IC), other control logic, other electronic circuits, or combinations thereof that include a number of electronic components for performing the functionality of instructions 222, 224, 226 and 228.

The machine-readable storage medium 220 may be any electronic, magnetic, optical, or other physical storage device that contains or stores executable instructions. Thus, the machine-readable storage medium 220 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 220 can be non-transitory. As described in detail below, machine-readable storage medium 220 may be encoded with a series of executable instructions for setting up the file system without editing the kernel code.

Figure 3:
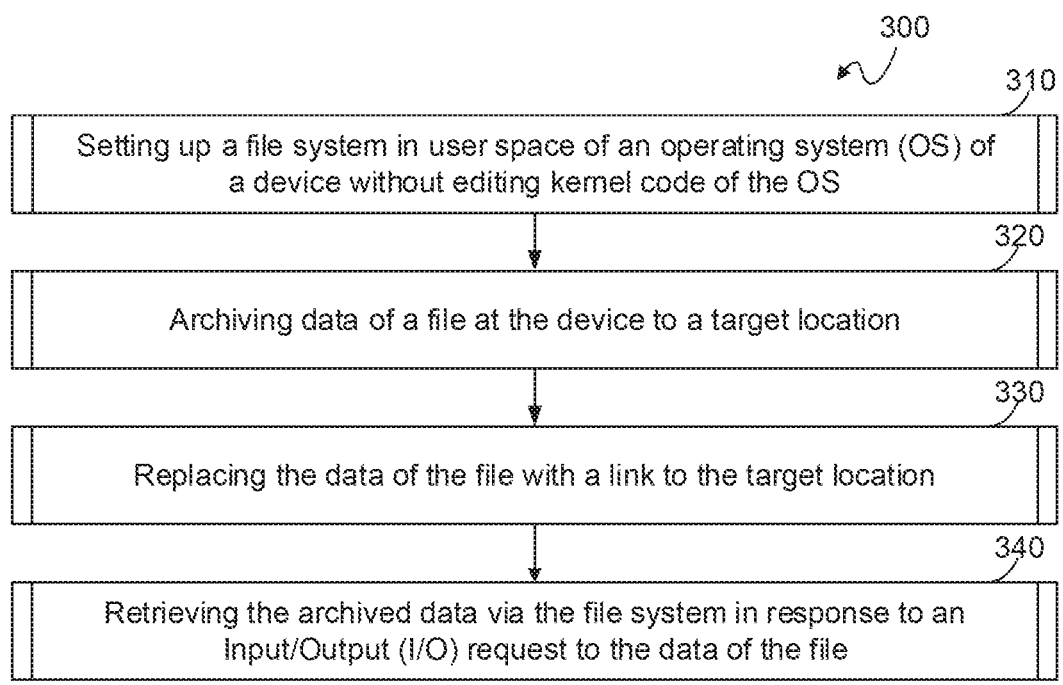
FIG. 3 is an example flowchart of a method for setting up a file system without editing kernel code.

Moreover, the instructions 222, 224, 226 and 228, when executed by a processor (e.g., via one processing element or multiple processing elements of the processor) can cause the processor to perform processes, such as, the process of FIG. 3. For example, the setup instructions 222 may be executed by the processor 210 to setup a file system on an OS without editing kernel code of the OS. The remove instructions 224 may be executed by the processor 210 to remove, via the file system, data from a file.

The archive instructions 226 may be executed by the processor 210 to archive, via the file system, the removed data to a target location separate from that of the file. The add instructions 228 may be executed by the processor 210 to add, via the file system, a link to the file that refers to the target location. The archived data may be retrieved using the link to redirect a request for the data of the file. The requested data may be returned without modification to the link.

FIG. 3 is an example flowchart of a method 300 for setting up a file system without editing kernel code. Although execution of the method 300 is described below with reference to the device 100, other suitable components for execution of the method 300 can be utilized. Additionally, the components for executing the method 300 may be spread among multiple devices (e.g., a processing device in communication with input and output devices). In certain scenarios, multiple devices acting in coordination can be considered a single device to perform the method 300. The method 300 may be implemented in the form of executable instructions stored on a machine-readable storage medium, such as storage medium 220, and/or in the form of electronic circuitry.

At block 310, the device 100 sets up a file system 140 in user space of an OS 110 of the device 100 without editing kernel code 160 of the OS 110. At block 320, the device 100 archives data 172 of a file 170 at the device 100 to a target location 180. At block 330, the device 100 replaces the data 172 of the file 170 with a link 182 to the target location 180. At block 340, the device 100 retrieves the archived data 172' via the file system 140 in response to an input/output (I/O) request to the data 172 of the file 170.

FIGS. 4A-4D are another example flowchart of a method 400 for setting up a file system without editing kernel code. Although execution of the method 400 is described below with reference to the device 100, other suitable components for execution of the method 400 can be utilized. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 220, and/or in the form of electronic circuitry.

Figure 4A:
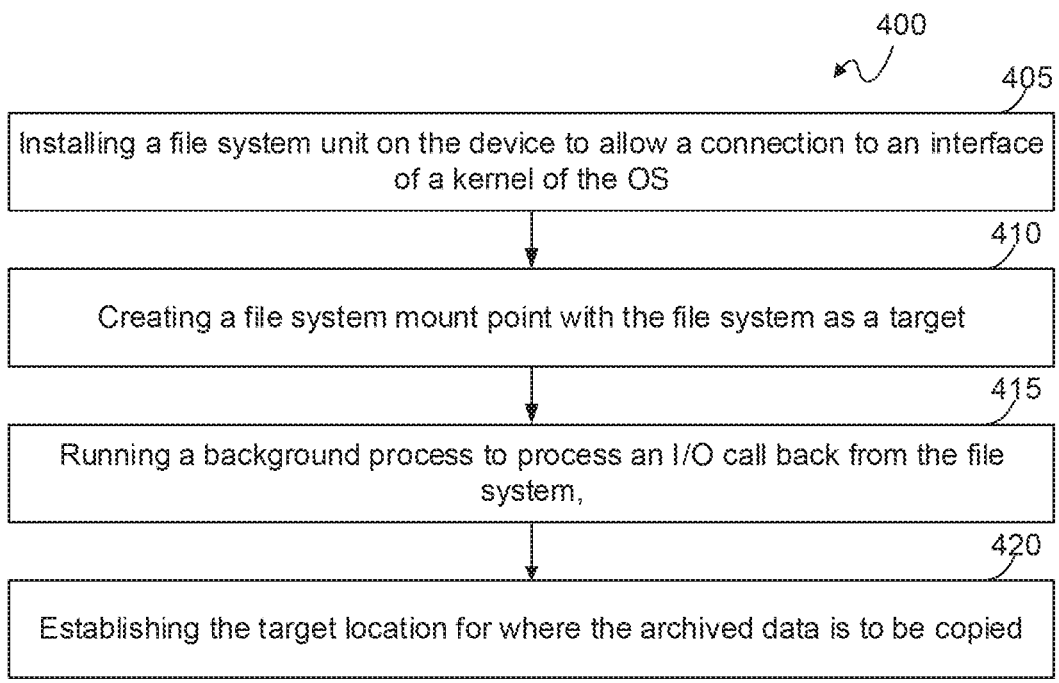
FIG. 4A is an example flowchart of the setting up block of FIG. 3.

FIG. 4A is an example flowchart of the setting up block 310 of FIG. 3. At block 405, the device 100 installs a file system unit 120 on the device 100 to allow a connection to an interface of a kernel of the OS 160. A non-privileged user is allowed to at least one setup and run the file system 140 in user space without editing the kernel code 160 of the OS via the connection. This file system 140 may provide a programmable call back feature to intercept all I/O request made to files under its control. The term callback may refer to a piece of executable code that is passed as an argument to other code, which is expected to call back (execute) the argument at some convenient time.

At block 410, the device 100 creates a file system mount point with the file system 140 as a target. The file system mount point to be a root directory of the file system. The term mount point may refer to a directory (typically an empty one) in the currently accessible file system on which an additional file system is mounted (i.e., logically attached).

At block 415, the device 100 installs and runs a background process 150 to process an I/O call back from the file system 140. The I/O call back may include executable code that is passed as an argument to other code. The file system 140 may redirect the I/O request to any file under control of the file system 140 via the I/O callback. At block 420, the device 100 establishes the target location 180 for where the archived data 172' is to be copied.

Figure 4B:
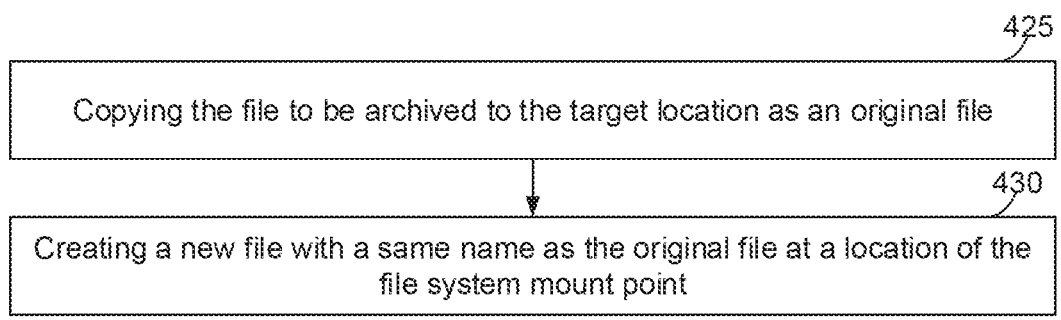
FIG. 4B is an example flowchart of the archiving block of FIG. 3.

FIG. 4B is an example flowchart of the archiving block 320 of FIG. 3. At block 425, the device 100 copies the file 170 to be archived to the target location 180 as an original file. At block 430, the device 100 creates a new file with a same name as the original file at a location of the file system mount point.

Figure 4C:
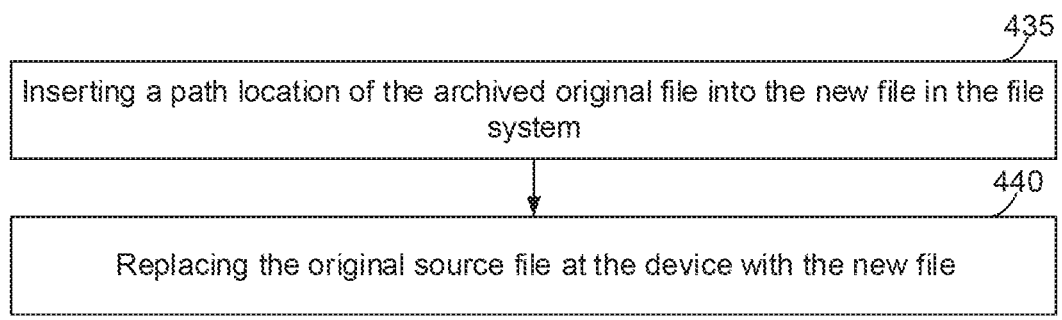
FIG. 4C is an example flowchart of the replacing block of FIG. 3.

FIG. 4C is an example flowchart of the replacing block 330 of FIG. 3. At block 435, the device 100 inserts a path location 182 of the archived original file into the new file in the file system 140, At block 440, the device 100 replaces the original source file at the device with the new file 170.

Figure 4D:
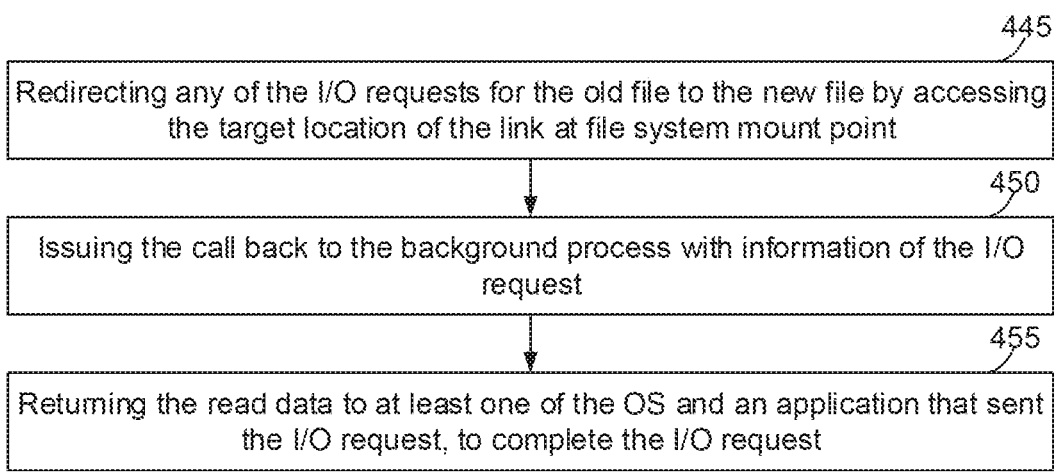
FIG. 4D is an example flowchart of the retrieving block of FIG. 3.

FIG. 4D is an example flowchart of the retrieving block 340 of FIG. 3. At block 445, the device 100 redirects any of the I/O requests for the old file to the new file 170 by accessing the target location 180 of the link 182 at file system mount point. At block 450, the device 100 issues the call back to the background process 150 with information of the I/O request.

The background process 150 is to at least one of extract the path location from the new file, use the path location to open the archived file, to read the data requested and to return the requested data to the file system 140. At block 455, the device 100 returns the read data to at least one of the OS 110 and an application that sent the I/O request, to complete the I/O request.

I claim:

1. A method, comprising:
   setting up a file system in a user space of an operating system (OS) of a device outside a kernel space of the OS without editing kernel code of the OS;
   removing, via the file system, data from a file at the device;
   archiving the data of the file at the device to a target location;
   replacing the data of the file that is removed from the file with a link to the target location;
   intercepting an input/output (I/O) request for the data of the file, in the user space of the OS outside the kernel space of the OS, by a programmable call back feature of the file system;
   redirecting the I/O request to the archived data at the target location based on the link in the file, wherein the I/O request is redirected to a daemon in the user space of the OS that is outside the kernel space of the OS; and
   retrieving the archived data via the file system based on the link to the target location in response to the I/O request to the data of the file.

2. The method of claim 1, wherein,
   the setting up further includes installing a file system unit on the device to allow a connection to an interface of a kernel of the OS, wherein
   a non-privileged user is allowed to setup and run the file system in the user space of the OS without editing the kernel code of the OS via the connection.

3. The method of claim 1, wherein the setting up further includes,
   creating a file system mount point with the file system as a target, the file system mount point to be a root directory of the file system, and
   establishing the target location for where the archived data is to be copied.

4. The method of claim 3, wherein,
   the setting up further includes running the daemon as a background process to process an I/O call back from the file system, the I/O call back to include executable code that is passed as an argument to other code, and
   the file system is to redirect the I/O request to any file under control of the file system via the I/O call back.

5. The method of claim 4, wherein the archiving further includes,
   copying the file to the target location as an original file, and
   creating a new file with a same name as the original file at a location of the file system mount point.

6. The method of claim 5, wherein the replacing further includes,
   inserting a path location of the original file into the new file in the file system, and
   replacing the original file at the device with the new file.

7. The method of claim 6, wherein the redirecting further includes redirecting, by the file system via the daemon, the I/O request to the new file by accessing the target location of the link at the file system mount point.

8. The method of claim 7, wherein the retrieving further includes returning, by the file system, read data from the target location to the OS and/or an application that sent the I/O request, to complete the I/O request.

9. The method of claim 7, wherein,
   the retrieving further includes issuing, by the file system, the I/O call back to the background process with information of the I/O request, and
   the background process is to extract the path location from the new file, to use the path location to open an archived file, to read the archived data, and/or to return the archived data to the file system.

10. The method of claim 4, wherein
    the target location is remote from the device, and
    the background process is a daemon service that is installed on the device.

11. The method of claim 1, wherein
    the OS of the device is Linux, and
    the file system is a Filesystem in Userspace (FUSE).

12. A device, comprising:
    a file system unit to allow a non-privileged user to setup a file system on an operating system (OS) without editing kernel code of the OS; and
    an archiving unit to archive data of a file at the device to a target location remote from the device, wherein
    the file system is to remove the data of the file from the file at the device,
    the file system is to replace the data of the file at the device with a link to the target location,
    the file system is to intercept an input/output (I/O) request for the data of the file, in a user space of the OS outside a kernel space of the OS, via a programmable call back feature, and
    the file system is to redirect the I/O request to the archived data at the target location via the link to the target location, wherein the I/O request is redirected to a daemon in the user space of the OS that is outside the kernel space of the OS.

13. The device of claim 12, wherein,
the file system is setup in the user space of the OS by a non-privileged user, and
the file system is to redirect the I/O request to the daemon, the daemon being a background process to retrieve the archived data.

14. A non-transitory computer-readable storage medium storing instructions that, if executed by a processor of a device, cause the processor to:
setup a file system on an operating system (OS) without editing kernel code of the OS;
remove, via the file system, data from a file;
archive, via the file system, the removed data to a target location separate from that of the file;
add, via the file system, a link to the file to replace the removed data, the link referring to the target location to retrieve the removed data that is archived at the target location;
intercept an input/output (I/O) request for the data from the file, in a user space outside a kernel space of the OS, by a programmable call back feature of the file system; and
redirect the I/O request to the removed data that is archived at the target location based on the link in the file, wherein the I/O request is redirected to a daemon in the user space of the OS that is outside the kernel space of the OS.

15. The non-transitory computer-readable storage medium of claim 14, wherein,
the removed data that is archived at the target location is retrieved using the link to redirect the I/O request for the data of the file, and
the removed data is returned without modification to the link.

16. The non-transitory computer-readable storage medium of claim 14, wherein the instructions further cause the processor to:
install a file system unit on the device to allow a connection to an interface of a kernel of the OS, wherein a non-privileged user is allowed to setup and run the file system in the user space of the OS without editing the kernel code of the OS via the connection.

17. The non-transitory computer-readable storage medium of claim 14, wherein the instructions further cause the processor to:
create a file system mount point with the file system as a target, the file system mount point to be a root directory of the file system; and
establish the target location for where the removed data is to be copied.

18. The non-transitory computer-readable storage medium of claim 14, wherein the instructions further cause the processor to:
run the daemon as a background process to process an I/O call back from the file system, the I/O call back to include executable code that is passed as an argument to other code; and
redirect, via the file system, the I/O request to any file under control of the file system via the I/O call back.

19. The non-transitory computer-readable storage medium of claim 14, wherein to archive the removed data to the target location, the instructions further cause the processor to:
copy the file to the target location as an original file;
create a new file with a same name as the original file at a location of a file system mount point with the file system as a target;
insert a path location of the original file into the new file in the file system; and
replace the original file with the new file.

20. The non-transitory computer-readable storage medium of claim 19, wherein,
to redirect the I/O request to the removed data, the instructions cause the processor to redirect, via the daemon, the I/O request to the new file by accessing the target location of the link at the file system mount point, and
the removed data is returned from the target location to the OS and/or an application that sent the I/O request, to complete the I/O request.

* * * * *